(12) United States Patent
Farooq et al.

(10) Patent No.: US 12,043,313 B1
(45) Date of Patent: Jul. 23, 2024

(54) DEPLOYABLE VEHICLE CROSSMEMBER

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/340,106

(22) Filed: Jun. 23, 2023

(51) Int. Cl.
*B62D 21/15* (2006.01)

(52) U.S. Cl.
CPC ............................ *B62D 21/152* (2013.01)

(58) Field of Classification Search
CPC ............................ B62D 21/152; B60R 21/34
See application file for complete search history.

(56) References Cited

U.S. PATENT DOCUMENTS

| | | | | |
|---|---|---|---|---|
| 3,887,223 A * | 6/1975 | Bez | ...................... | B62D 21/152 293/133 |
| 3,896,896 A * | 7/1975 | Saitoh | .................. | B62D 21/152 296/187.03 |
| 3,899,047 A * | 8/1975 | Maeda | ..................... | F16F 7/125 293/133 |
| 4,093,290 A * | 6/1978 | Pearson | .................. | B60R 21/34 293/38 |
| 6,398,285 B2 * | 6/2002 | Motozawa | ........... | B62D 21/152 296/68.1 |
| 6,676,709 B1 * | 1/2004 | de la Asuncion | ...... | B62D 39/00 180/274 |
| 6,908,128 B2 * | 6/2005 | Strong | ................. | B62D 21/157 293/126 |
| 9,061,712 B2 | 6/2015 | Patberg et al. | | |
| 9,205,803 B2 | 12/2015 | Farooq et al. | | |
| 10,525,928 B2 | 1/2020 | Farooq et al. | | |
| 2018/0354438 A1 | 12/2018 | Baccouche et al. | | |

FOREIGN PATENT DOCUMENTS

CN 109955704 B 8/2021

* cited by examiner

*Primary Examiner* — Faye M Fleming
(74) *Attorney, Agent, or Firm* — Frank A. MacKenzie; Bejin Bieneman PLC

(57) ABSTRACT

A vehicle includes a frame and a body. The body defines a passenger cabin and has a front bulkhead. The vehicle includes a crossmember supported by the frame and elongated along a vehicle-lateral axis. The crossmember is movable forward from a stowed position at the bulkhead along a vehicle-longitudinal axis away from the front bulkhead to a deployed position. The vehicle includes a pyrotechnic actuator configured to move the crossmember from the stowed position to the deployed position.

20 Claims, 5 Drawing Sheets

DEPLOYABLE VEHICLE CROSSMEMBER

BACKGROUND

Vehicles typically include a vehicle body that defines a passenger compartment. Vehicle may include structure, such as support beams and bulkheads, to control kinematics of other vehicle structures relative to the vehicle body during certain impacts to the vehicle.

DETAILED DESCRIPTION

Figure 1:
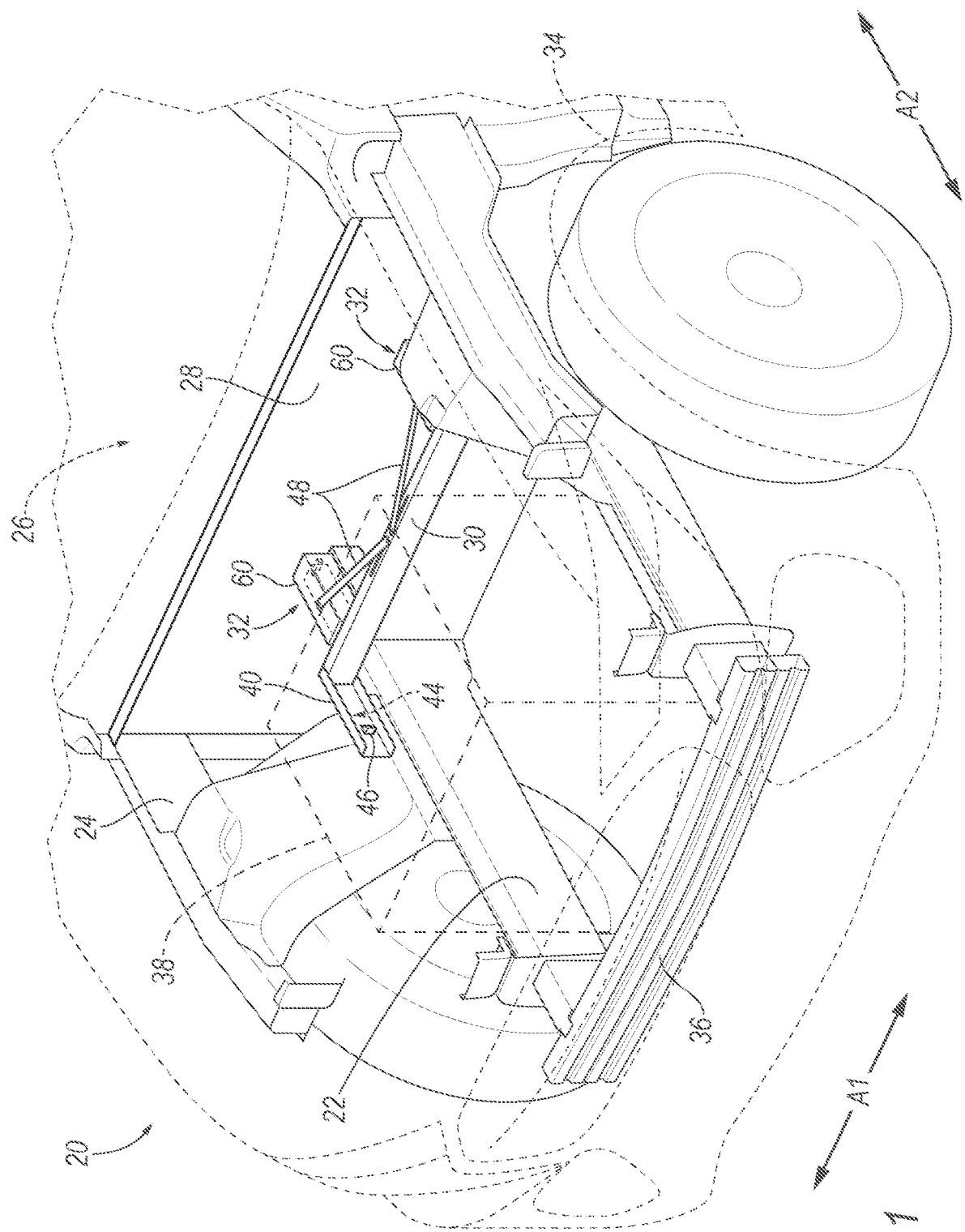
FIG. 1 is a perspective view of a front portion of a vehicle with a cross member at a stowed position.

A vehicle includes a frame. The vehicle includes a body defining a passenger cabin and having a front bulkhead. The vehicle includes a crossmember supported by the frame and elongated along a vehicle-lateral axis, the crossmember movable forward from a stowed position at the front bulkhead along a vehicle-longitudinal axis away from the front bulkhead to a deployed position. The vehicle includes a pyrotechnic actuator configured to move the crossmember from the stowed position to the deployed position.

The vehicle may include a computer having a processor and a memory storing instructions executable to actuate the pyrotechnic actuator and move the crossmember from the stowed position to the deployed position in response to detecting certain vehicle impacts.

The body may define a front wheel well and the crossmember at the stowed position may be between the front bulkhead and the front wheel well.

The vehicle may include a first track and a second track both elongated along the vehicle-longitudinal axis and spaced from each other along the vehicle-lateral axis, the crossmember supported by and movable along the first track and the second track.

The crossmember may be linearly translatable along the first track and the second track.

The vehicle may include a lock configured to maintain the crossmember at the deployed position.

The vehicle may include an engine supported by the frame, the crossmember between the front bulkhead and the engine along the vehicle-longitudinal axis.

The vehicle may include a front bumper, the engine between the crossmember and the front bumper along the vehicle-longitudinal axis.

The pyrotechnic actuator may include a first telescoping member and a second telescoping member slidable relative to the first telescoping member.

The vehicle may include a support bar connected to the crossmember and extending rearward from the crossmember.

The support bar may be elongated transverse to the vehicle-lateral axis and the vehicle-longitudinal axis.

The support bar may be pivotally connected to at least one of the body or the frame.

The support bar may be pivotally connected to the crossmember.

The support bar may include an end, the end of the support bar translatable along the crossmember from a first position with the crossmember at the stowed position to a second position with the crossmember at the deployed position.

The end at the first position may be vehicle-inboard of the end at the second position.

The vehicle may include a lock configured to maintain the end at the second position.

The support bar may include a second end opposite the end, the end forward of the second end.

The end may be vehicle-inboard of the second end.

The vehicle may include an engine supported by the frame, the end and the second end of the support bar between the front bulkhead and the engine along the vehicle-longitudinal axis.

The frame and the body may have a unibody construction.

With reference to the Figures, wherein like numerals indicate like parts throughout the several views, a vehicle 20 having a frame 22 and a body 24 is shown. The body 24 defines a passenger cabin 26 and has a front bulkhead 28. The vehicle 20 includes a crossmember 30 supported by the frame 22 and elongated along a lateral axis A1. The crossmember 30 is movable forward from a stowed position at the front bulkhead 28 along a longitudinal axis A2 away from the front bulkhead 28 to a deployed position. The vehicle 20 includes a pyrotechnic actuator 32 configured to move the crossmember 30 from the stowed position to the deployed position.

In the present description, relative vehicular orientations and directions (by way of example, top, bottom, front, rear, forward, rearward, outboard, inboard, inward, outward, lateral, left, right, etc.) is from the perspective of an occupant seated in the vehicle 20 facing forward, e.g., toward a forward instrument panel and/or forward windshield of the vehicle 20. The forward direction of the vehicle 20 is the direction of movement of the vehicle 20 when the vehicle 20 is engaged in forward drive with wheels of the vehicle 20 aligned straight.

The vehicle 20 may be any suitable type of automobile, e.g., a passenger or commercial automobile such as a sedan, a coupe, a truck, a sport utility vehicle, a crossover vehicle, a van, a minivan, a taxi, a bus, etc.

The vehicle 20 defines the lateral axis A1 and the longitudinal axis A2. The lateral axis A1 extends between a right side and a left side of the vehicle 20. The longitudinal axis A2 extends between a front and a rear of the vehicle 20. The longitudinal axis A2 and the lateral axis A1 are perpendicular to each other.

The frame 22 and the body 24 of the vehicle 20 may be of a unibody construction in which the frame 22 is unitary with the body 24. As another example, the body 24 and frame 22 may have a body-on-frame construction (also referred to as a cab-on-frame construction) in which the body 24 and the frame 22 are separate components, i.e., are modular, and the body 24 is supported on and affixed to the frame 22. Alternatively, the frame 22 and the body 24 of the vehicle 20 may have any suitable construction. The frame 22 and the body 24 may be of any suitable material, for example, steel, aluminum, and/or fiber-reinforced plastic, etc. The body 24 may include body panels partially defining an exterior of the vehicle 20. The body 24 panels may present a class-A surface, e.g., a finished surface exposed to view by a customer and free of unaesthetic blemishes and defects.

The passenger cabin 26 is defined by the body 24 and houses occupants, if any, of the vehicle 20. The passenger cabin 26 may extend across the vehicle 20, e.g., from the left side of the vehicle 20 to the right side of the vehicle 20. The passenger cabin 26 includes a front end and a rear end with the front end being in front of the rear end during forward movement of the vehicle 20.

The front bulkhead 28 of the body 24 is at the front end of the passenger cabin 26. The front bulkhead 28 is elongated along the lateral axis A1 of the vehicle 20. In other words, the front bulkhead 28 is longer along the lateral axis A1 than along the longitudinal axis A2. The front bulkhead 28 may extend from a pillar on the right-side of the vehicle 20 to a pillar on the left-side of the vehicle 20. In other words, the front bulkhead 28 may extend completely across the passenger cabin 26 along the lateral axis A1. The front bulkhead 28 may extend from a floor of the passenger cabin 26 to the front windshield. The front bulkhead 28 may include the forward instrument panel. The instrument panel may include one or more instruments such as gauges, displays, a user interface, etc. The instrument panel may be elongated along the lateral axis A1 from the left-side of the vehicle 20 to the right-side of the vehicle 20. The instrument panel presents information to and may receive information from an occupant of the vehicle 20. The instrument panel may include dials, digital readouts, screens such as a touch-sensitive display screen, speakers, buttons, knobs, keypads, microphone, and so on for providing information to, and receiving information from, the occupant. The instrument panel may support vehicle controls, including a steering wheel.

The body 24 of the vehicle 20 defines two front wheel wells 34, i.e., a left-front wheel well 34 and a right-front wheel well 34, that house front wheels of the vehicle 20. The wheel wells 34 are voids occupied by the wheels of the vehicle 20. The vehicle 20 may include body panels, cladding, etc., lining the front wheel wells 34. The front wheel wells 34 are forward of the front bulkhead 28.

The vehicle 20 includes a front bumper 36. The front bumper 36 is attached or integrated to the front of the vehicle 20 to absorb certain impact energy in a certain vehicle impacts. The front bumper 36 may be disposed under a front facia of the body 24 of the vehicle 20. The front bumper 36 is supported by, e.g., fixed to, the frame 22. The front bumper 36 is elongated along the lateral axis A1, e.g., extending from the right side of the vehicle 20 to the left side of the vehicle 20.

The vehicle 20 may include an engine 38 that provides torque to wheels of the vehicle 20, e.g., to propel the vehicle 20. The engine 38 is supported by the frame 22. For example, the engine 38 may be fixed to the frame 22 via fasteners, brackets, or other suitable structure. The engine 38 translates stored energy in the form of fuel into rotary motion of a driveshaft. The engine 38 may include spark plugs, fuel injectors, a carburetor, etc. The engine 38 may include one or more pistons and cylinders, a crankshaft, etc. The engine 38 may be of any other suitable design, e.g., a piston-less rotary engine (also known as a Wankel engine), etc.

The vehicle 20 may include a first track 40 and a second track 42 for guiding movement of the crossmember 30. The first track 40 and the second track 42 may permit movement of the crossmember 30 along the longitudinal axis A2 and inhibit movement of the crossmember 30 transverse to the longitudinal axis A2. The first track 40 and the second track 42 are both elongated along the longitudinal axis A2. In other words, the first track 40 and the second track 42 are longer along the longitudinal axis A2 than along the lateral axis A1. The first track 40 and the second track 42 are spaced from each other along the lateral axis A1, e.g., with the crossmember 30 the between. The first track 40 and the second track 42 may be supported by the frame 22 and/or the body 24 of the vehicle 20. The first track 40 and the second track 42 may be fixed to the frame 22 and/or the body 24 of the vehicle 20, e.g., via fasteners, brackets, weld, etc. The first track 40 and the second track 42 may be rearward of engine 38 and forward of the front bulkhead 28. In other words, the first track 40 and the second track 42 may be between the front bulkhead 28 and the engine 38 along the longitudinal axis A2. The first track 40 and the second track 42 may be C-shaped in cross-section, U-shaped in cross-section, or any suitable shape. The first track 40 and the second track 42 may each define a channel 44. The channels 44 may be elongated along the longitudinal axis A2.

The crossmember 30 is included in the vehicle 20 to control kinematics of various vehicle structures relative to the body 24. For example, the crossmember 30 at the deployed position may limit movement of the engine 38, or other vehicle structure, rearward toward the passenger cabin 26. The crossmember 30 is elongated along the lateral axis A1 of the vehicle 20. In other words, the crossmember 30 may be elongated parallel to the lateral axis A1. The crossmember 30 may be a rectangular, or any other shape, in cross-section. The crossmember 30 may be metal, such as aluminum or steel, or any other suitable material. The crossmember 30 may be between the front bulkhead 28 and the engine 38 along the longitudinal axis A2. In other words, the engine 38 may be forward of the crossmember 30 and the front bulkhead 28 may be rearward of the crossmember 30. The engine 38 may be between the crossmember 30 and the front bumper 36 along the longitudinal axis A2. In other words, the front bumper 36 may be forward of the engine 38 and the crossmember 30 may be rearward of the engine 38.

The crossmember 30 is supported by the frame 22, e.g., via the first track 40 and the second track 42. The crossmember 30 is movable relative to the frame 22, e.g., along the first track 40 and the second track 42. For example, the crossmember 30 may be linearly translatable along the first track 40 and the second track 42. In other words, the first track 40 and the second track 42 may permit movement of the crossmember 30 along the elongation of the first track 40 and the second track 42, and inhibit movement of the crossmember 30 transverse to the elongation. The first track 40 and the second track 42 may permit movement of the crossmember 30 along the longitudinal axis A2 and inhibit movement of the crossmember 30 transverse to the longitudinal axis A2. Ends of the crossmember 30 may be disposed within the channels 44 of the first track 40 and the second track 42. The ends may be linearly translatable along the channels 44. The crossmember 30 may be fixed to shuttles (not shown) that are movable along the first track 40 and the second track 42, e.g., translatable along the channels 44. Any other suitable structure may be used to support and permit movement of the crossmember 30, e.g., fasteners, brackets, bushing, bearings, rollers, etc.

Figure 2:
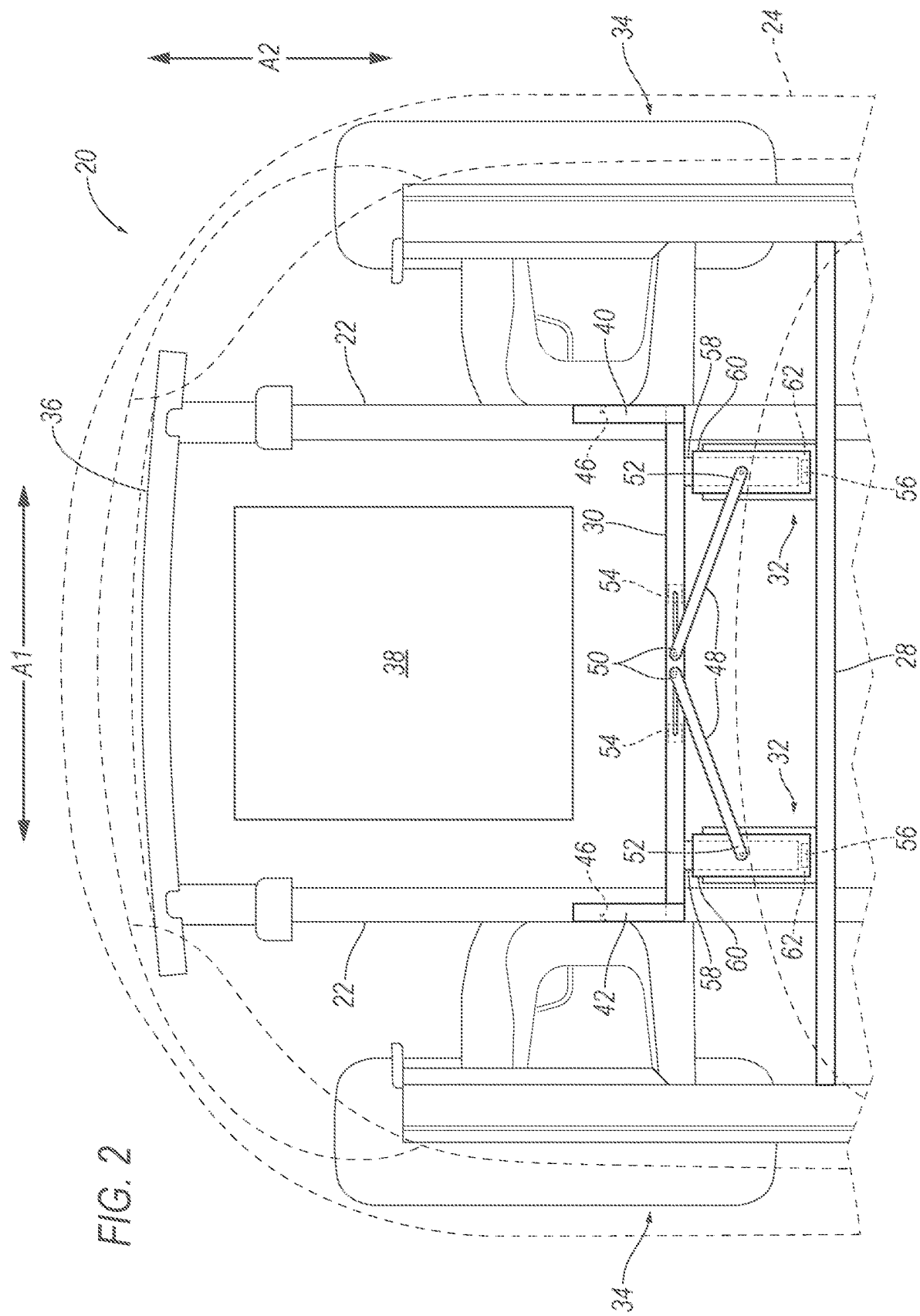
FIG. 2 is a top view of the front portion of the vehicle with the cross member at the stowed position.
Figure 3:
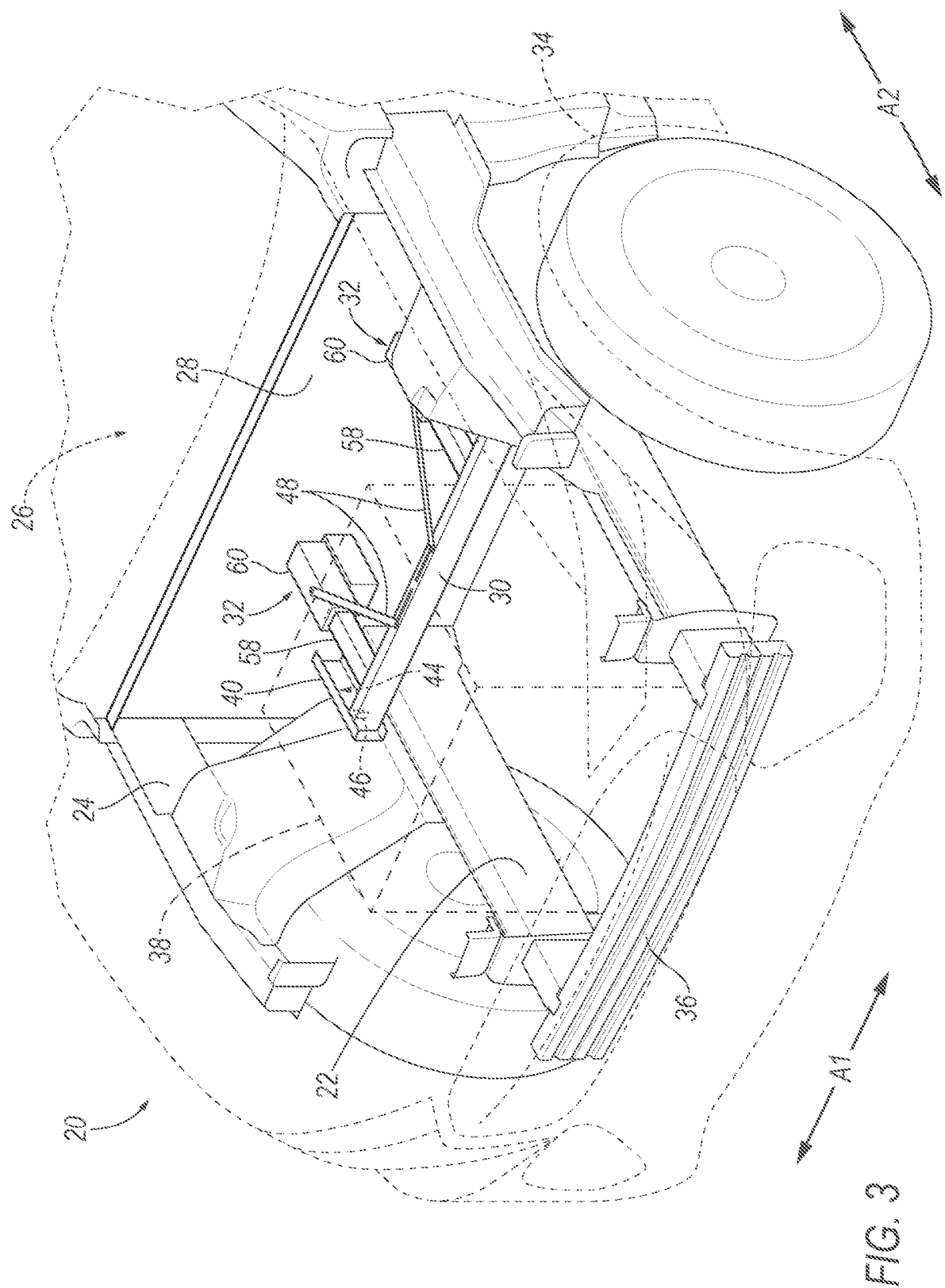
FIG. 3 is a perspective view of the front portion of the vehicle with the cross member at a deployed position.
Figure 4:
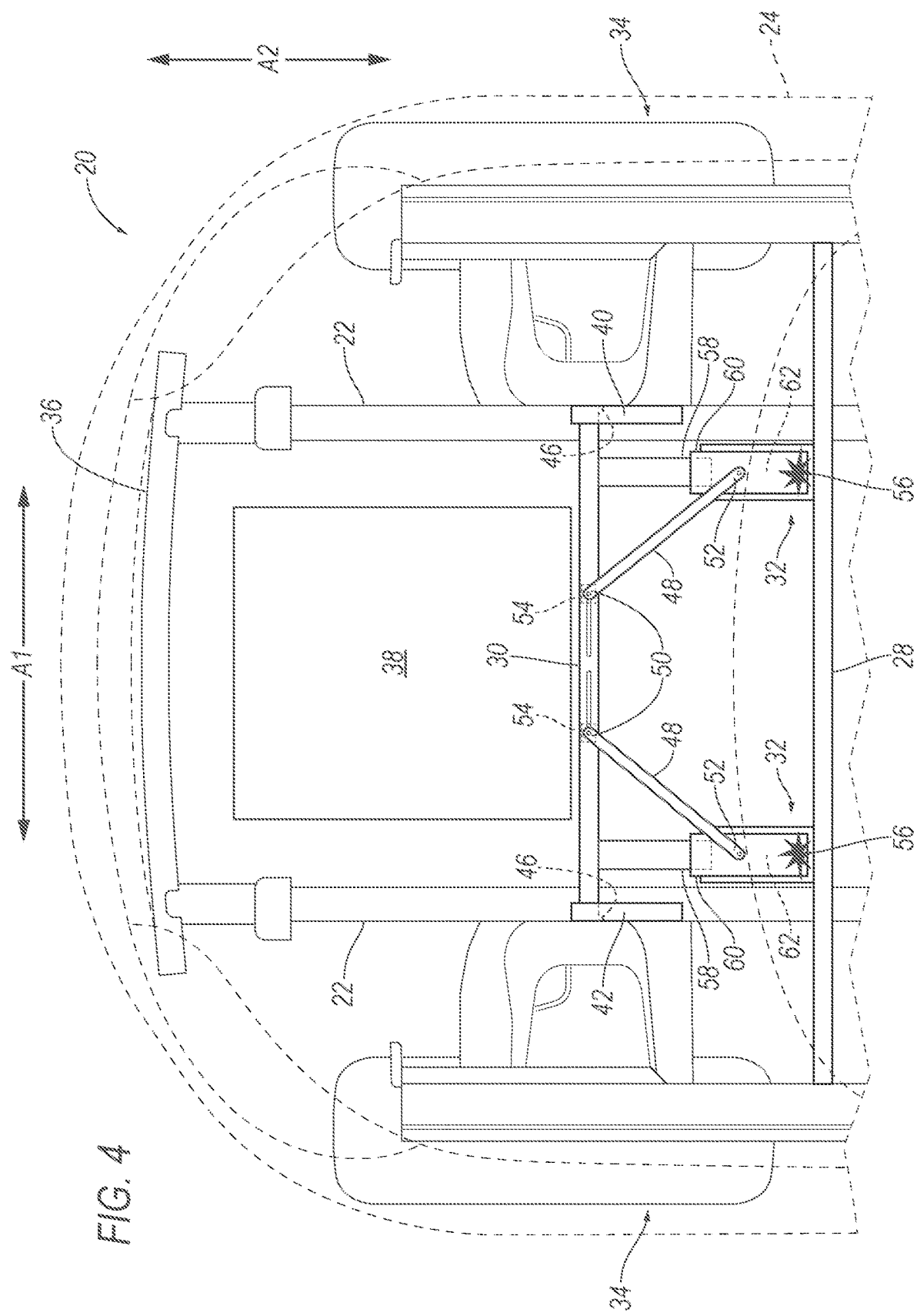
FIG. 4 is a is a top view of the front portion of the vehicle with the cross member at the deployed position.

The crossmember 30 is movable from the stowed position, shown in FIGS. 1 and 2, to the deployed position, shown in FIGS. 3 and 4. The crossmember 30 at the stowed position is at the front bulkhead 28. For example, the crossmember 30 at the stowed position may abut the front bulkhead 28. As another example, the crossmember 30 at the stowed position may be between the front bulkhead 28 and the front wheel wells 34 along the longitudinal access. In other words, the front wheel wells 34 may be forward of the crossmember 30 at the stowed position and the front bulkhead 28 may be rearward. The crossmember 30 at the stowed position is movable forward along the longitudinal axis A2 away from the front bulkhead 28 to the deployed position. The crossmember 30 at the deployed position is spaced forward from the front bulkhead 28. The crossmember 30 at the deployed position is farther from the front bulkhead 28 than at the stowed position. The crossmember 30 at the deployed position may be closer to the engine 38 than at the stowed position.

The vehicle 20 may include one or more first locks 46 configured to maintain the crossmember 30 at the deployed position. In other words, the first locks 46 may permit movement of the crossmember 30 from the stowed position to the deployed position and inhibit movement of the crossmember 30 away from the deployed position. The first locks 46 may include latches, ratchet teeth, pins, springs, or any suitable structure, including conventional locks. Structures of the first locks 46, e.g., the latches, may engage the crossmember 30 at the deployed position. For example, the latches may be movable between an extended position and a retracted position. Springs may urge the latches to the extended positions. Normal forces between the crossmember 30 and sloped surfaces of the latches may urge the latches to the retracted positions as the crossmember 30 moves to the deployed position. The first locks 46 may be supported by, e.g., fixed to, the frame 22, the first track 40, the second track 42, or any suitable structure of the vehicle 20.

The vehicle 20 may include one or more support bars 48 that provide increase rigidity to the crossmember 30, e.g., in the deployed position. Each support arm 48 may include a first end 50 and an opposite second end 52. The first ends 50 of the support bars 48 may be forward of the second ends 52 along the longitudinal axis A2. For example, the first ends 50 may be between the front bumper 36 and the second ends 52. The first ends 50 may vehicle-inboard of the second ends 52. In other words, the first ends 50 may be closer to a lateral center of the vehicle 20 than the second ends 52. The first end 50 and the second end 52 of the support bar may both be between the front bulkhead 28 and the engine 38 along the longitudinal axis A2. The first ends 50 may be closer to the crossmember 30 than the second ends 52. The second ends 52 may be closer to the front bulkhead 28 than the first ends 50.

The support bars 48 extend rearward from the crossmember 30. For example, the first ends 50 may be connected to the crossmember 30 and the second ends 52 spaced behind the crossmember 30. The support bars 48 may each be elongated between the first end 50 and the second end 52. The support bars 48 may be elongated transverse to the lateral axis A1 and the longitudinal axis A2. In other words, the support bars 48 are not parallel to the lateral axis A1 or the longitudinal axis A2.

The support bars 48 are connected to the crossmember 30, e.g., the first end 50 of the support bars 48 may be connected via a pivot assembly, hinge pin, shuttle, fastener, bracket, and/or other suitable structure. The support bars 48 may be pivotally connected to the crossmember 30. For example, the support bars 48 may pivot about the hinge pins, or other suitable structure, that connects the first ends 50 to the crossmember 30.

The support bars 48 are connected to the frame 22 and/or the body 24 of the vehicle 20, e.g., the second end 52 of the support bars 48 may be connected via a pivot assembly, hinge pin, fastener, bracket, and/or other suitable structure. The support bars 48 may be pivotally connected to at least one of the body 24 or the frame 22. For example, the support bars 48 may pivot about hinge pins, or other suitable structure, that connects the second ends 52 to the frame 22 and/or body 24.

The first ends 50 of the support bars 48 may be translatable along the crossmember 30 from first positions, shown in FIGS. 2, to second positions shown in FIG. 4. For example, the hinge pins, shuttles, etc., connecting the support arms to the crossmember 30 may be slidable along, slots in the crossmember 30. The slots may be elongated along the lateral axis A1. Other suitable structures, such as a tracks or the like, may be fixed to the crossmember 30 and enable translational movement of the first ends 50 of the support bars 48 along the crossmember 30. The first ends 50 at the first position may be vehicle-inboard of the first ends 50 in the second position. In other words, the first ends 50 may translate from the first positions away from the lateral center of the vehicle 20 to the second positions. The first ends 50 may pivot at the crossmember 30 and the second ends 52 may pivot at the frame 22 and/or the body 24 as the crossmember 30 moves from the stowed position to the deployed position. The support bars 48 are at the first positions with the crossmember 30 at the stowed position. The support bars 48 are at the second positions with the crossmember 30 at the deployed position. Movement of the crossmember 30 from the stowed position to the deployed position may translate the first ends 50 from the first positions to the second positions.

The vehicle 20 may include one or more second locks 54 configured to maintain the first ends 50 of the support bars 48 at the second positions. In other words, the second locks 54 may permit movement of the first ends 50 from the first positions to the second positions and inhibit movement of the first ends 50 away from the second positions. The second locks 54 may include latches, ratchet teeth, pins, springs, or any suitable structure, including conventional locks. Structures of the second locks 54, e.g., the latches, may engage the first ends 50 at the second positions. The second locks 54 may be supported by, e.g., fixed to, the crossmember 30.

The vehicle 20 includes one or more pyrotechnic actuators 32 for moving the crossmember 30. The pyrotechnic actuator 32 is actuatable, e.g., by a computer 64 of the vehicle 20. The pyrotechnic actuator 32 is configured to move the crossmember 30 from the stowed position to the deployed position. The pyrotechnic actuator 32 may be supported, e.g., fixed to the frame 22 and/or the body 24. The pyrotechnic actuator 32 may be between the crossmember 30 and the front bulkhead 28 along the longitudinal axis A2. The pyrotechnic actuator 32 generates force, e.g., via increasing in length between opposing ends, upon actuation. The pyrotechnic actuator 32 includes pyrotechnic material 56 that rapidly increases in volume upon actuation, e.g., in response to receiving an electrical pulse. The pyrotechnic material 56 may be combustible to produce gas. The pyrotechnic material 56 may be formed of a solid mixture of substances that, when ignited, react to produce the gas. For example, the pyrotechnic material 56 may be formed of sodium azide (NaNO3), potassium nitrate (KNO3), and silicon dioxide (SiO2), which react to form nitrogen gas (N2).

The pyrotechnic actuator 32 may include, for example, a first telescoping member 58 and a second telescoping member 60 slidable relative to the first telescoping member 58. The first telescoping member 58 may be connected to the crossmember 30 and the second telescoping member 60 may be connected to the frame 22, the body 24, the first track 40, the second track 42, etc. The first telescoping member 58 may be slidable within the second telescoping member 60, e.g., in a piston and cylinder arrangement. The pyrotechnic material 56 may be in a combustion chamber 62 of the second telescoping member 60 between the first telescoping member 58 and the front bulkhead 28. Actuation of the pyrotechnic material 56, e.g., in response to receiving an electrical pulse, may generate gas and urge the first telescoping member 58 to slide within the second telescoping member 60 and increase the length of the pyrotechnic actuator 32. The pyrotechnic actuator 32 may include any other suitable structure for generating force from the actuation of the pyrotechnic material 56, e.g., including conventional structures. Each pyrotechnic actuator 32 may include a lock (not shown) configured to maintain the pyrotechnic actuator 32 at the deployed position. The locks may include latches, ratchet teeth, pins, springs, or any suitable structure, including conventional locks. Structures of the locks, e.g., the latches, may engage the first telescoping member 58 at the deployed position.

Figure 5:
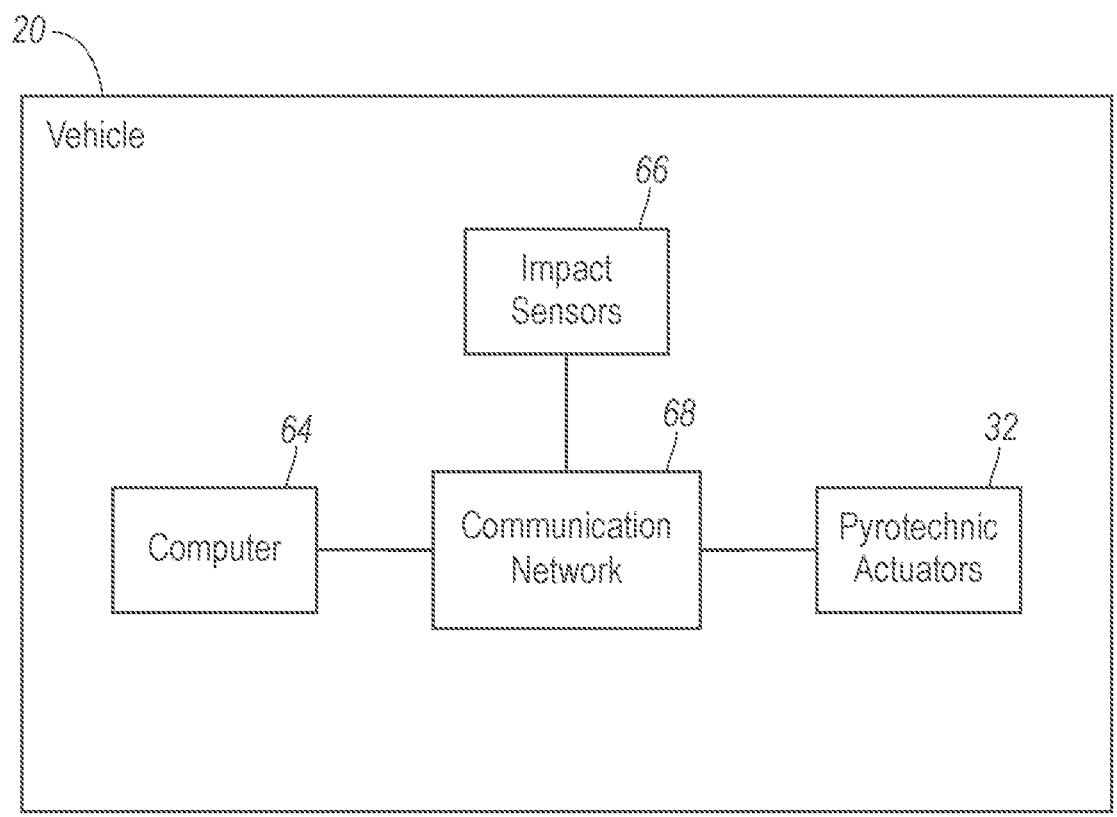
FIG. 5 is a block diagram of components of the vehicle.

With reference to FIG. 5, the vehicle 20 may include at least one impact sensor 66 for sensing certain vehicle impacts (e.g., impacts of a certain magnitude, direction, etc.), and the computer 64 in communication with the impact sensor 66 and the pyrotechnic actuator 32. The computer 64 may activate the pyrotechnic actuator 32, e.g., provide an impulse to a pyrotechnic charge of the pyrotechnic actuator 32 when the impact sensor 66 senses certain vehicle impacts. The impact sensor 66 may be configured to sense certain vehicle impacts prior to impact, i.e., pre-impact sensing. The impact sensor 66 is configured to detect certain vehicle impacts. In other words, a "certain vehicle impact" is an impact of the type and/or magnitude for which actuation of the crossmember 30 is designed i.e., "certain" indicates the type and/or magnitude of the impact. The type and/or magnitude of such "certain vehicle impacts" may be pre-stored in the computer 64, e.g., a restraints control module and/or a body control module. The impact sensor 66 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 66 may be located at numerous points in or on the vehicle 20.

The computer 64 of the vehicle 20 controls actuation of the crossmember 30 from the stowed position to the deployed position. The computer 64 is generally arranged for communications on a communication network 68 that can include a bus in the vehicle 20 such as a controller area network (CAN) or the like, and/or other wired and/or wireless communication mechanisms. Via the communication network 68, the computer 64 may transmit messages to various devices in the vehicle 20, and/or receive messages (e.g., CAN messages) from the various devices, e.g., the pyrotechnic actuators 32, the impact sensors 66, etc. Alternatively or additionally, in cases where the computer 64 comprises a plurality of devices, the communication network 68 may be used for communications between devices represented as the computer 64 in this disclosure.

The computer 64 includes a processor and a memory. The memory includes one or more forms of computer readable media, and stores instructions executable by the processor for performing various operations, processes, and methods, as disclosed herein. For example, the computer 64 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 64 may be a restraints control module. In another example, computer 64 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 64. The memory can be of any type, e.g., hard disk drives, solid state drives, servers, or any volatile or non-volatile media. The memory can store the collected data sent from the sensors.

The computer 64 is programmed to, i.e., the memory stores instructions executable by the processor to, actuate the pyrotechnic actuator 32 and move the crossmember 30 from the stowed position to the deployed position. The computer 64 may actuate the pyrotechnic actuator 32 by transmitting a command, such as an electric pulse, to the pyrotechnic actuator 32 via the communication network 68. The command may trigger the pyrotechnic material 56 of the pyrotechnic actuator 32, e.g., can cause the first telescoping member 58 to slide forward in the telescoping member and move the crossmember 30 to the deployed position.

The computer 64 is programmed to actuate the pyrotechnic actuator 32 in response to detecting certain impacts the vehicle 20. The computer 64 may detect certain impacts to the vehicle 20 based on the information received from the impact sensors 66 via the communication network 68. The information received by the computer 64 from the impact sensors 66 may indicate, for example, certain front impacts to the vehicle 20. In response to receiving such information, the computer 64 may actuate the pyrotechnic actuator 32 to move the crossmember 30 to the deployed position.

The adjectives "first" and "second" are used throughout this document as identifiers and do not signify importance, order, or quantity.

Computer executable instructions may be compiled or interpreted from computer programs created using a variety of programming languages and/or technologies, including, without limitation, and either alone or in combination, Java, C, C+, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
   a frame;
   a body defining a passenger cabin and having a front bulkhead;
   a crossmember supported by the frame and elongated along a vehicle-lateral axis, the crossmember movable forward from a stowed position at the front bulkhead along a vehicle-longitudinal axis away from the front bulkhead to a deployed position; and
   a pyrotechnic actuator configured to move the crossmember from the stowed position to the deployed position.

2. The vehicle of claim 1, further comprising a computer having a processor and a memory storing instructions executable to actuate the pyrotechnic actuator and move the crossmember from the stowed position to the deployed position in response to detecting certain vehicle impacts.

3. The vehicle of claim 1, wherein the body defines a front wheel well and the crossmember at the stowed position is between the front bulkhead and the front wheel well.

4. The vehicle of claim 1, further comprising a first track and a second track both elongated along the vehicle-longitudinal axis and spaced from each other along the vehicle-lateral axis, the crossmember supported by and movable along the first track and the second track.

5. The vehicle of claim 4, wherein the crossmember is linearly translatable along the first track and the second track.

6. The vehicle of claim 1, further comprising a lock configured to maintain the crossmember at the deployed position.

7. The vehicle of claim 1, further comprising an engine supported by the frame, the crossmember between the front bulkhead and the engine along the vehicle-longitudinal axis.

8. The vehicle of claim 7, further comprising a front bumper, the engine between the crossmember and the front bumper along the vehicle-longitudinal axis.

9. The vehicle of claim 1, wherein the pyrotechnic actuator includes a first telescoping member and a second telescoping member slidable relative to the first telescoping member.

10. The vehicle of claim 1, further comprising a support bar connected to the crossmember and extending rearward from the crossmember.

11. The vehicle of claim 10, wherein the support bar is elongated transverse to the vehicle-lateral axis and the vehicle-longitudinal axis.

12. The vehicle of claim 11, wherein the support bar is pivotally connected to at least one of the body or the frame.

13. The vehicle of claim 12, wherein the support bar is pivotally connected to the crossmember.

14. The vehicle of claim 10, wherein the support bar includes an end, the end of the support bar translatable along the crossmember from a first position with the crossmember at the stowed position to a second position with the crossmember at the deployed position.

15. The vehicle of claim 14, wherein the end at the first position is vehicle-inboard of the end at the second position.

16. The vehicle of claim 14, further comprising a lock configured to maintain the end at the second position.

17. The vehicle of claim 14, wherein the support bar includes a second end opposite the end, the end forward of the second end.

18. The vehicle of claim 17, wherein the end is vehicle-inboard of the second end.

19. The vehicle of claim 17, further comprising an engine supported by the frame, the end and the second end of the support bar between the front bulkhead and the engine along the vehicle-longitudinal axis.

20. The vehicle of claim 1, wherein the frame and the body have a unibody construction.

* * * * *